United States Patent [19]

Herrmann et al.

[11] Patent Number: 5,578,537
[45] Date of Patent: Nov. 26, 1996

[54] OLEFIN POLYMERIZATION CATALYST PROCESS FOR ITS PREPARATION AND ITS USE

[75] Inventors: Hans-Friedrich Herrmann, Darmstadt; Bernd Bachmann, Eppstein/Taunus; Walter Spaleck, Liederbach, all of Germany

[73] Assignee: Hoechst Aktiengesellschaft, Germany

[21] Appl. No.: 320,127

[22] Filed: Oct. 7, 1994

Related U.S. Application Data

[63] Continuation of Ser. No. 55,237, Apr. 28, 1993, abandoned.

[30] Foreign Application Priority Data

Apr. 29, 1992 [EP]  European Pat. Off. ............... 92107331

[51] Int. Cl.⁶ .................................. C08F 4/18; C08F 4/64
[52] U.S. Cl. ........................ 502/120; 502/103; 502/117; 502/132; 502/152; 526/129; 526/160; 526/943
[58] Field of Search ..................................... 502/103, 117, 502/120, 132, 152

[56] References Cited

U.S. PATENT DOCUMENTS

| 4,814,310 | 3/1989 | Chang | 502/107 |
|---|---|---|---|
| 4,925,821 | 5/1990 | Chang | 502/107 |
| 4,937,217 | 6/1990 | Chang | 502/111 |
| 5,008,228 | 4/1991 | Chang | 502/111 |
| 5,234,878 | 8/1993 | Tsutsui et al. | 502/103 |

FOREIGN PATENT DOCUMENTS

| 44603/85 | 1/1986 | Australia . |
|---|---|---|
| 48893/90 | 8/1989 | Australia . |
| 55772/90 | 1/1991 | Australia . |
| 70079/91 | 4/1991 | Australia . |
| 64439/90 | 4/1991 | Australia . |
| 65308/90 | 5/1991 | Australia . |
| 68174/90 | 6/1991 | Australia . |
| 68173/90 | 6/1991 | Australia . |
| 71344/91 | 9/1991 | Australia . |
| 71345/91 | 9/1991 | Australia . |
| 170059 | 5/1986 | European Pat. Off. . |
| 0368644 | 8/1989 | European Pat. Off. . |
| 0399347 | 11/1990 | European Pat. Off. . |
| 0442725 | 8/1991 | European Pat. Off. . |
| 0522581 | 1/1993 | European Pat. Off. . |
| 91/05810 | 5/1991 | WIPO . |

OTHER PUBLICATIONS

Abstract No. 112:99482z, "Preparing metallocene–aluminoxane/silica gel polymerization catalyst", PCT Int. appl. WO 89 09,237, Oct., 1989.
Abstract No. 113:232258y, "Catalysts and olefin polymerization therewith", JP 02,173,104, Jul. 1990.
Abstract No. 116:174977c, "Supported olefin polymerization catalysts", JP 04 11,604, Jan. 1992.

Primary Examiner—David W. Wu
Attorney, Agent, or Firm—Connolly & Hutz

[57] ABSTRACT

A supported polymerization catalyst which is applicable in all polymerization processes is comprised of the reaction product of (A) a supported organoaluminum compound and (B) a metallocene catalyst component.

13 Claims, No Drawings

OLEFIN POLYMERIZATION CATALYST PROCESS FOR ITS PREPARATION AND ITS USE

This application is a continuation of application Ser. No. 08/055,237 filed Apr. 28, 1993, now abandoned.

The present invention relates to a supported (heterogeneous) catalyst which can advantageously be employed in the polymerization of olefins.

Processes are known for the preparation of polyolefins using homogeneous catalyst systems comprising a transition-metal component of the metallocene type and a cocatylst component, an oligomeric aluminum compound of the aluminoxane type (usually methylaluminoxane ("MAO")) which have high activity and give polymers or copolymers with narrow molecular weight distribution (cf. EP-A-69 951).

A major disadvantage of these soluble metallocene/methylaluminoxane catalyst systems in processes where the polymer is formed as a solid is the formation of thick deposits on reactor walls and stirrers. These deposits are always formed due to agglomeration (Polymer Commun. 32 (1991) 58) of the polymer particles if the metallocene or the aluminoxane or both are used as a solution in the suspension medium. Deposits of this type in the reactor systems must be removed regularly since they rapidly reach considerable thicknesses, have high strength and prevent heat exchange with the cooling medium.

It has been attempted to support the catalyst by mixing MAO and metallocene with inorganic supports (EP 206 794). In order to improve the supporting, it has been proposed (WO 88/01626) to specially treat the support materials with adhesion promoters. Furthermore, it is known (EP 295 312) that the solubility of the methylaluminoxane used can be reduced, in a complex procedure, by means of nonpolar solvents such as n-decane. However, these support methods are not completely effective and result, for example, in detachment of the aluminum or transition-metal components in a typical medium for suspension or solution polymerization.

As an alternative, it has been proposed to prepare methylaluminoxane by reacting water-containing $SiO_2$ with trimethylaluminum and to use the resultant suspension as a support for metallocenes (EP 323 716) or to carry out the entire reaction of trimethylaluminum, water-containing $SiO_2$ and metallocene in the polymerization reactor, in which the polymerization is subsequently carried out (EP 170 059). However, these processes firstly also give methylaluminoxanes dissolved in the reaction medium, which eliminate the advantage of the support, and secondly the supported aluminoxanes have significantly lower polymerization activity since only the overall stoichiometry is determined and the local control of the reaction stoichiometry of water and trimethylaluminum is inadequate.

The object was therefore to find a generally applicable way of fixing metallocene polymerization catalysts to supports which is simple and inexpensive to carry out and can be employed universally without significantly impairing the activity of the catalyst.

Surprisingly, a good and simple support method which is universally applicable in all polymerization processes arises if a supported organoaluminum catalyst component A is reacted with an organometallic, soluble catalyst component B. The use of the supported organoaluminum component A prevents any detachment of aluminum or transition-metal compounds under polymerization conditions.

The resultant catalyst system according to the invention does not require any additional cocatalyst for activation and completely prevents the formation of reactor deposits.

A further advantage of the catalyst system according to the invention is that aromatic solvents can be avoided completely, and consequently the resultant polymer product is not contaminated by traces of aromatic hydrocarbons. Such products are advantageous in applications in the foodstuffs and medical sectors.

To prepare the supported, organoaluminum compound (catalyst component A), the support is suspended in the solution of at least one alkylaluminum compound under inert conditions, and this suspension is hydrolyzed by means of the addition of water.

The support is an oxide of silicon or aluminum which may additionally contain one or more other oxides of the elements Al, K, Mg, Na, Si, Ti or Zr and whose surface may additionally be rendered hydrophobic by reaction with alkylsilanes, alkylhalosilanes, alkoxysilanes, silazanes, siloxanes or other alkyl compounds. Before use, the support can be freed from adsorbed water and oxygen in vacuo, in an oven, in a heated fluidized bed or in another way. The support pretreated in this way has a residual water content, which can be removed by igniting at 1000° C. for 2 hours, of less than 3% by weight.

Inorganic supports which can be employed are oxides produced by flame pyrolysis by burning elemental halides, for example, chlorosilanes $H_nSiCl_{4-n}$, in an oxyhydrogen gas flame or those which can be prepared as silica gels in certain particle size distributions and particle shapes.

To prepare catalyst component A, the support described is metered into the solution of at least one alkylaluminum compound of the formula $AlRR^1R^2$ where the radicals R, $R^1$ and $R^2$ may be identical or different and are a $C_1$–$C_6$-alkyl group, a $C_1$–$C_6$-fluoroalkyl group, a $C_6$–$C_{18}$-aryl group, a $C_6$–$C_8$-fluoroaryl group or hydrogen, preferably methyl, ethyl, i-propyl, i-butyl or n-butyl, under inert conditions and is suspended by stirring, pumping or in another way. The support is employed in an amount of less than 0.1 kg. preferably less than 0.05 kg, per mol of alkylaluminum, and the amount of solvent is selected so that a maximum of 20% by weight, preferably a maximum of 10% by weight, of support are supended. Besides known aromatic solvents such as toluene, it is also possible to use aliphatic solvents such as pentane, hexane, heptane, n-decane or diesel oils (boiling points in the range 60°–300° C.).

Water or solutions, mixtures or emulsions of water with other solvents are carefully added to the support suspension prepared in this way at temperatures of from −20° to +60° C. with cooling and intimate stirring or in a pumped circulation with considerable turbulence or in another way. The water may be metered in continuously or in small portions and the total amount of water is between 50 mol-% and 100 mol-%, preferably between 50 mol-% and 80 mol-%, based on the number of mols of aluminum of the initially introduced alkylaluminum compounds.

The catalyst component A prepared in this way can be washed as prepared as a suspension of by repeated decantation or separated off by filtration, washed and then resuspended or dried.

However, catalyst component A can also be prepared analogously to other MAO preparation processes if water is introduced in solid or liquid form and the pure alkylaluminum compound solution is replaced by a suspension of the support in an alkylaluminum compound solution. Processes of this type are described, for example, in DE 37 31 665 and DE 40 04 477.

Catalyst component B is a metallocene or a mixture of more than one metallocene.

The catalysts obtained when more than one metallocene is employed are particularly suitable for the preparation of so-called reactor blends with bi- or multi-modal molecular weight distributions.

In principle, any metallocene can be employed, irrespective of the structure and composition. The metallocenes may be bridged or unbridged, and contain identical or different ligands. The metallocenes are compounds of metals from groups IVb, Vb or VIb of the Periodic Table, for example compounds of titanium, zirconium, hafnium, vanadium, niobium, tantalum, chromium, molybdenum or tungsten, preferably of zirconium, hafnium or titanium, in particular of zirconium.

Metallocenes of this type are known and are described, for example, in the following documents: EP-A-336 127, EP-A-336 128, EP-A-387 690, EP-A-387 691, EP-A-302 424, EP-A-129 368, EP-A-320 762, EP-A-284 707, EP-A-316,155, EP-A-351-392, US-5 017 714 and J. Organomet. Chem., 342 (1988) 21.

Of particular interest are metallocenes, specifically zirconocenes, which carry indenyl derivatives as ligands. These are preferably compounds of the formula I

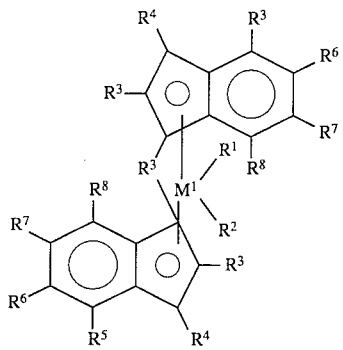

in which $M^1$ is a metal from group IVb, Vb or VIb of the Periodic Table, $R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group, a OH group or a halogen atom, the radicals $R^3$ are identical or different and are hydrogen atom, a halogen atom, a $C_1$–$C_{10}$-alkyl group, which may be halogenated, a $C_6$–$C_{10}$-aryl group, a —$NR_2$, —$SR$, —$OSiR_3$, —$SiR_3$ or $PR_2$ radical in which R is a halogen atom, a $C_1$–$C_{10}$-alkyl group or a $C_6$–$C_{10}$-aryl group, $R^4$ to $R^8$ are as defined for $R^3$ or adjacent radicals $R^3$, $R^4$, $R^5$, $R^6$, $R^7$, $R^8$ can form an aromatic or aliphatic ring together with the atoms connecting them,

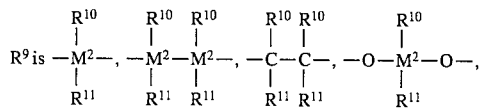

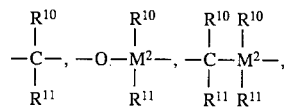

=$BR^{10}$, =$AlR^{10}$, —Ge—, —Sn—, —O—, —S—, =SO, =$SO_2$, =$NR^{10}$, =CO, =$PR^{10}$, =$P(O)R^{10}$ or hydrogen, where $R^{10}$ and $R^{11}$ are identical or different and are a hydrogen atom, a halogen atom, a $C_1$–$C_{10}$-alkyl group, a $C_1$–$C_{10}$-fluoroalkyl group, a $C_6$–$C_{10}$-aryl group, a $C_6$–$C_{10}$-fluoraryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{10}$ and $R^{11}$, in each case together with the atoms connecting them, for a ring, and $M^2$ is silicon, germanium or tin.

The 4,5,6,7-tetrahydroindenyl analogs corresponding to the compounds I are likewise of importance.

In the formula I, it is preferred that $M^1$ is zirconium, $R^1$ and $R^2$ are identical and are methyl or chlorine, in particular chlorine, $R^3$–$R^8$ are hydrogen or $C_1$–$C_4$-alkyl, $R^9$ is

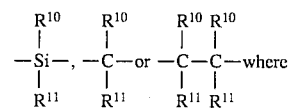

$R^{10}$ and $R^{11}$ are identical or different and are $C_1$–$C_4$-alkyl or $C_6$–$C_{10}$-aryl. In particular, $R^{10}$ and $R^{11}$ are identical or different and are methyl or phenyl.

The indenyl or tetrahydroindenyl ligands of formula I are preferably substituted in 2-, 2,4-, 4,7-, 2,6-, 2,4,6-, 2,5,6-, 2,4,5,6- or 2,4,5,6,7-positions, in particular in 2,4,6-position, preferably by a $C_1$–$C_4$-alkyl group, such as for example, methyl, ethyl or isopropyl. The 2-position is preferably substituted by methyl.

Also of particular importance are compounds I in which the substituents in the 4- and 5-positions of the indenyl radicals ($R^5$ and $R^6$), together with the atoms connecting them, form a benzene ring. This fused ring system may likewise be substituted by radicals as defined for $R^3$–$R^8$. An example of a compound I of this type is dimethylsilanediyl-bis(2-methyl-4,5-benzoindenyl)zirconiumdichloride.

The metallocenes I are particularly suitable for the preparation of polyolefins of high stereoregularity and high molecular weight.

The metallocenes I and the metallocenes described in the documents cited can be prepared, for example, in accordance with the reaction scheme below:

$H_2R^c$ + butyl Li $\longrightarrow$ $HR^cLi \xrightarrow[\text{(not for unbridged metallocenes)}]{X-R^9-X}$ $H_2R^d$ + butyl Li $\longrightarrow HR^dLi$ $HR^c-R^9-R^dH \xrightarrow{\text{2 butyl Li}} LiR^c-R^9-R^dLi \xrightarrow{M^1Cl_4}$

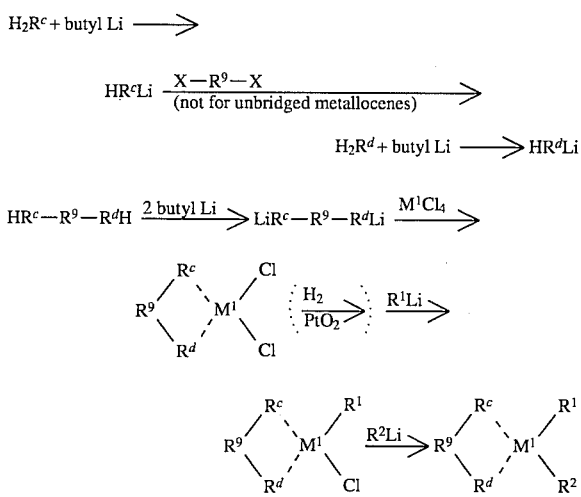

X=Cl, Br I, or O-tosyl; $H_2R^c$ and $H_2R^d$ are ligands, for example (substituted) indene

* additional hydrogenation step if, for example, indenyl ligands are to be converted into tetrahydroindenyl ligands.

The preparation processes are in principle known from the literature; cf. Journal of Organometallic Chem. 288 (1985) 63–67, EP-A-320 762 and the cited documents with respect to the metallocenes described therein.

The compounds I are prepared using variously substituted indenes as starting materials ($H_2R^c$ and $H_2R^d$; cf. the reaction scheme shown). Some of these indene derivatives are known and are commercially available. Specifically substituted indenes can be prepared by the processes indicated below:

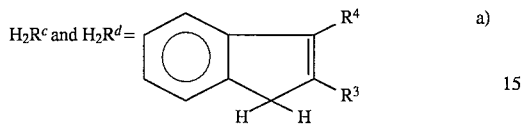  a)

The synthesis is carried out in accordance with or analogous to the references below:

J. Org. Chem., 49 (1984) 4226–4237, J. Chem. Soc., Perkin II, 1981, 403–408, J. Am. Chem. Soc., 106 (1984) 6702, J. Am. Soc., 65 (1943) 567, J. Med. Chem., 30 (1987) 1303–1308 and Chem. Ber. 85 (1952) 78–85.

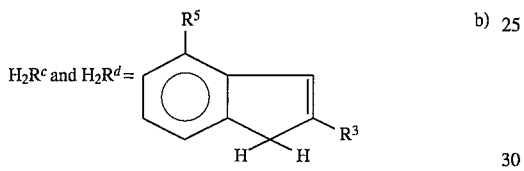  b)

The 2,4-substituted indenes $H_2R^c$ and $H_2R^d$ used as starting substances can be prepared by two different routes:

b1) The starting compound used is a ketoaldehyde of the formula shown in the reaction scheme below, whose preparation is known (Synthesis 1985, 1058).

The reaction of the ketoaldehyde with cyclopentadiene is carried out in an inert solvent in the presence of a base. Alcohols, such as methanol, ethanol or t-butanol, in particular methanol, are preferably used.

Bases which can be used are a large number of compounds. Examples which may be mentioned are alkali and alkaline earth metal hydroxides, alkali and alkaline earth metal alkoxides, such as sodium methoxide, sodium ethoxide and potassium tertiary butoxide, amides, such as lithium diisopropylamide or amines. Preference is given to sodium ethoxide, potassium tertiary butoxide and potassium hydroxide.

The molar ratio between the starting compounds, including the bases used, can vary within broad limits. The ketoaldehyde:cyclopentadiene:base molar ratio is preferably 1:1–1.5:2–3, in particular 1:1.1:2.5.

The reaction temperature is preferably from −40° to 100° C., in particular from 0° to 25° C.

The reaction times generally vary between 10 minutes and 100 hours, preferably between 1 and 30 hours.

The substituent in the 2-position can be introduced by a Grignard reaction after conversion of the 4-monosubstituted indene into the 4-monosubstituted 2-indanone by a general procedure (Organic Synthesis, Coil. Vol. V, 1973, 647). The subsequent elimination of water gives the 2,4-substituted indenes.

The 2,4-substituted indenes are obtained as double bond isomers which can be employed directly for the synthesis of the corresponding metallocene complexes.

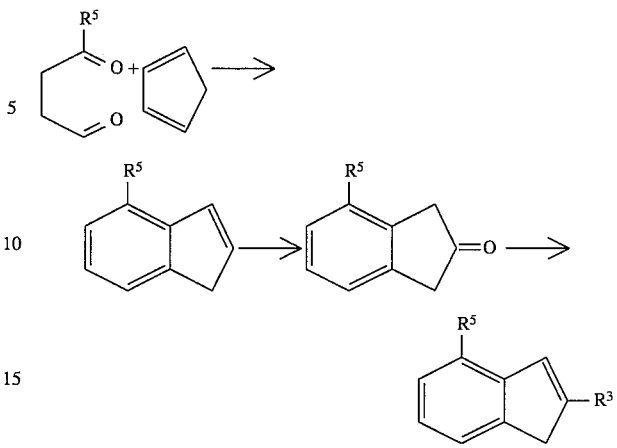

b2) Another possible and advantageous strategy involves the following scheme: A 2-substituted benzyl halide is reacted with an appropriately substituted malonic diester analogously to a process known from the literature (J. Org. Chem. 1958, 23, 1437) to give the disubstituted malonic diester.

Hydrolysis of the diester and decarboxylation by conventional processes gives a disubstituted propionic acid derivative.

Ring closure to give the 2,4-disubstituted 1-indanone is carried out by customary processes (Friedel-Crafts reaction) after conversion of the carboxylic acid into the carboxylic acid chloride.

Reduction of the ketone by known methods and subsequent elimination of water gives the 2,4-disubstituted indenes.

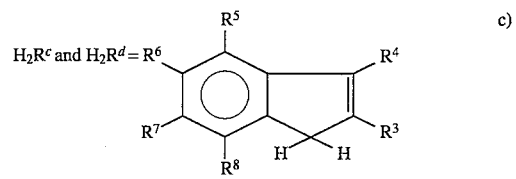  c)

The compounds $H_2R^c$ and $H_2R^d$ are prepared by reacting a compound II

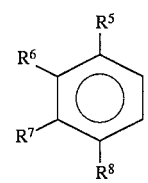

with a compound III

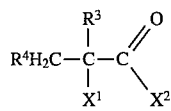

or the anhydride thereof in the presence of a Friedel-Crafts catalyst. In this formula, $X^1$ and $X^2$ are a nucleophilic leaving group, such as, for example, halogen, hydroxyl groups or tosyl groups, in particular bromine or chlorine.

The indanones IV or IVa

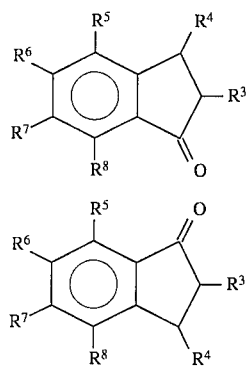

are obtained. Depending on the substitution pattern on the aromatic ring, the indanones can be obtained in the form of two constitutional isomers of the formulae IV and IVa. These can be reduced in pure form or as a mixture by methods known from the literature by means of reducing agents such as $NaBH_4$ or $LiAlH_4$ to the corresponding indanoles and subsequently dehydrated by means of acids, such as sulfuric acid, oxalic acid or p-toluene sulfonic acid, or alternatively by treatment with dehydrating substances, such as magnesium sulfate, sodium sulfate, aluminum oxide, silica gel or molecular sieves, to give indenes of the formulae V and Va respectively ($H_2R^c/H_2R^d$) (Bull. Soc. Chim. Fr. 11 (1973) 3092; Organomet. 9 (1990) 3098).

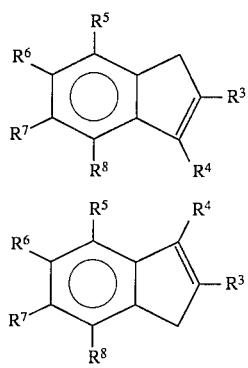

Examples of suitable Fiedel-Crafts catalysts are $AlCl_3$, $AlBr_3$, $FeCl_3$, $SbCl_5$, $SnCl_4$, $BF_3$, $TiCl_4$, $ZnCl_2$, $H_2SO_4$, polyphosphoric acid, $H_3PO_4$ or an $AlCl_3/NaCl$ melt, in particular $AlCl_3$.

The starting compounds of the formulae II and III are known and are commercially available or can be prepared by processes known from the literature.

The reaction is carried out in an inert solvent, preferably methylene chloride or $CS_2$. If the starting components are liquid, it is not necessary to use a solvent.

The molar ratios between the starting compounds, including the Fiedel-Crafts catalyst, can vary within broad limits. The compound II:III:catalyst molar ratio is preferably 1:0.5–1.5:1–5, in particular 1:1:2.5–3.

The reaction temperature is preferably from 0° to 130° C., in particular from 25° to 80° C.

The reaction times generally vary between 30 minutes and 100 hours, preferably between 2 and 30 hours.

It is preferred to initially introduce a mixture of the compounds II and III and to meter in the Friedel-Crafts catalyst. The reverse sequence of addition is also possible.

The indanones of the formulae IV and IVa can be purified by distillation, column chromatography or crystallization.

The substituted indenes may be obtained as double bond isomers (V/Va). These can be purified from byproducts by distillation, column chromatography or crystallization.

Starting from the indenes of the formulae V and Va, which can be employed as and isomer mixture, the preparation of the metallocenes I proceeds by processes known from the literature (cf. AU-A-31 478/89, j. Organomet. Chem. 342 (1988) 21, and EP-A-284 707) in accordance with the reaction scheme shown.

$H_2R^c$ and $H_2R^d =$

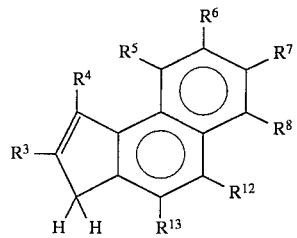

where $R^{12}$ and $R^{13}$ are as defined for $R^4$–$R^8$

The preparation of these benzo-fused indenes and their further conversion to the metallocenes I are carried out in accordance with the reaction scheme below:

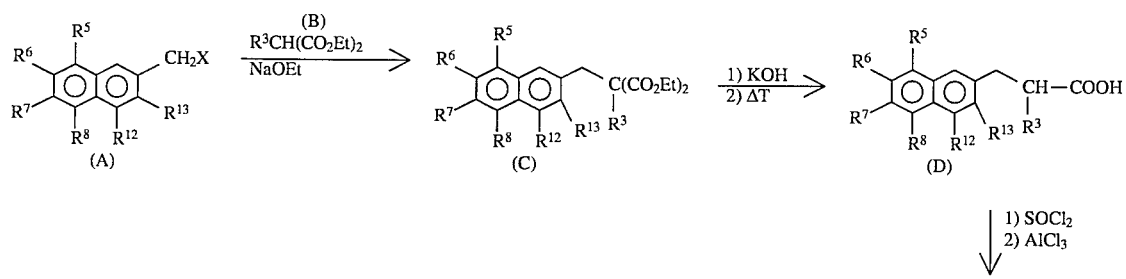

-continued

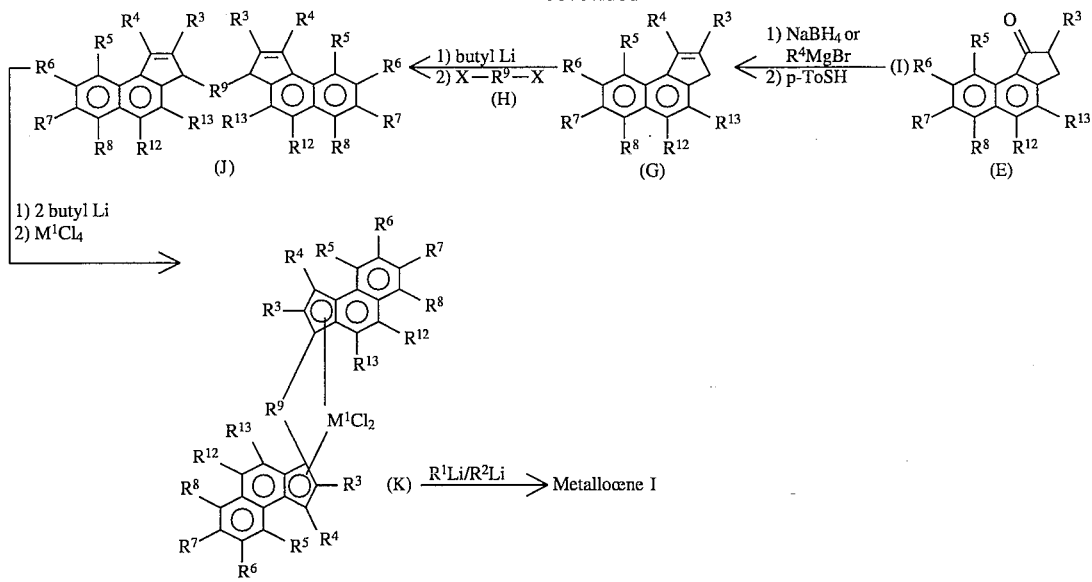

X = nucleophilic leaving group, such as, for example, halogen or tosyl
Et = ethyl The naphthalene derivatives of the formula A are commercially available or can be prepared by methods known from the literature ("Friedel Crafts and Related Reactions", Wiley, New York, 1964, Vol. II, pp. 659–766, Bull. Sox. Chim. Beiges, 58 (1949) 87, J. Amer. Chem. Soc. 89 (1967) 2411 ).

Conversion to the compounds of the formula C is carried out by methods known from the literature by reaction with substituted malonic esters of the formula B under basic conditions, such as, for example, in ethanolic solutions of sodium ethoxide (J. Org. Chem. 23 (1958) 1441, and J. Am. Chem. Soc. 70 (1948) 3569).

The compounds of the formula C are hydrolyzed by methods known from the literature using alkali metal hydroxides, such as potassium hydroxide or sodium hydroxide, and decarboxylated by methods known from the literature by thermolysis of the resultant dicarboxylic acid to give the compounds of the formula D (J. Org. Chem. 23 (1958) 1441, and J. Am. Chem. Soc. 70 (1948) 3569).

The ring closure to give the substituted benzoindanones of the formula E is carried out by methods known from the literature by reaction with chlorinating reagents, such as, for example, $SOCl_2$, to give the corresponding acid chlorides and subsequent cyclization by means of a Friedel-Crafts catalyst in an inert solvent, such as, for example, by means of $AlCl_3$ or polyphosphoric acid in methylene chloride or $CS_2$ (Organometallics 9 (1990) 3098, Bull. Soc. Chim. Fr. 3 (1967) 988, and J. Org. Chem. 49 (1984) 4226).

Conversion into the benzoindene derivatives of the formula G is carried out by methods known from the literature by reduction using sodium borohydride or lithium aluminum hydride in an inert solvent, such as, for example, diethyl ether or THF, or by alkylation using alkylating agents of the formula F or using alkyllithium compounds to give the corresponding alcohols and dehydration of the alcohols under acidic conditions, such as, for example, using p-toluenesulfonic acid or oxalic acid, or by reaction with dehydrating substances, such as magnesium sulfate or molecular sieves (Organometallics 9 (1990) 3098, Acta. Chem. Scand. B 30 (1976) 527, and J. Amer. Chem. Soc. 65 (1943) 567).

The benzoindene derivatives of the formula G can also be synthesized in 4 steps by another synthetic route, not described in greater detail here, starting from substituted naphthalenes (Bull. Soc. Chim. Fr. 3 (1967) 988).

The preparation of the ligand systems of the formula J and the conversion to the bridged chiral metallocenes of the formula K and the isolation of the desired racemic form are known in principle (AU-A-31 478/89, J. Organomet. Chem. 342 (1988) 21, EP 0 284 707 and EP 0 320 762). To this end, the benzoindene derivative of the formula G is deprotonated by means of strong bases, such as, for example, butyllithium, in an inert solvent and reacted with a reagent of the formula H to give the ligand system of the formula J. This is subsequently deprotonated by means of two equivalents of a strong base, such as for example, butyllithium, in an inert solvent and reacted with the corresponding metal tetrahalide, such as, for example, zirconium tetrachloride, in a suitable solvent. Suitable solvents are aliphatic and aromatic solvents, such as, for example, hexane or toluene, ethereal solvents, such as, for example, tetrahydrofuran or diethyl ether, or halogenated hydrocarbons, such as, for example, methylene chloride. The racemic and meso forms are separated by extraction or recrystallization using suitable solvents.

The derivitization to give the metallocenes of the formula I can be carried out by methods known from the literature, for example by reaction with alkylating agents, such as, for example, methyllithium (Organometallics 9 (1990) 1539, J. Amer, Chem. Soc 95 (1973) 6283, and EP 0 277 004).

The following compounds may be mentioned as examples of metallocenes which can be used according to the invention:

biscyclopentadienylzirconium dichloride, biscyclopentadienyldimethylzirconium, biscyclopentadienyldiphenylzirconium, biscyclopentadienyldibenzylzirconium, biscyclopentadienylbistrimethylsilylzirconium, bis(methylcyclopentadienyl)zirconium dichloride, bis(1,2-dimethylcyclopentadienyl)zirconium dichloride, bis(1,3-dimethylcyclopentadienyl)zirconium dichloride, bis(1,2,4-trimethylcyclopentadienyl)zirconium dichloride, bis(1,2,3-trimethylcyclopentadienyl)zirconium dichloride,
bis(pentamethylcyclopentadienyl)zirconium dichloride,
bis(pentamethylcyclopentadienyl)zirconium dichloride,
bisindenylzirconium dichloride,
diphenylmethylene(9-fluorenyl)(cyclopentadienyl)zirconium dichloride,
isopropylidene(9-fluorenyl)(cyclopentadienyl)zirconium dichloride,
dimethylsilylbis-1-tetrahydroindenylzirconium dichloride,
dimethylsilylbis-1-(2-methyltetrahydroindenyl)zirconium dichloride,
dimethylsilylbis-1-(2,3,5-trimethylcyclopentadienyl)-zirconium dichloride,
dimethylsilylbis-1-(2,4-dimethylcyclopentadienyl)-zirconium dichloride,
dimethyldilylbis-1-indenylzirconium dichloride,
dimethylsilylbis-1-indenyldimethylzirconium,
dimethylgermylbis-1-indenylzirconium dichloride,
dimethylsilylbis-1-(2-methylindenyl)zirconium dichloride,
dimethylsilylbis-1-(2-methyl-4-isopropylindenyl)zirconium dichloride,
phenylmethylsilylbis-1-(2-methylindenyl)zirconium dichloride,
dimethylsilylbis-1-(2-methyl-4-ethylindenyl)zirconium dichloride,
ethylenebis-1-(4,7-dimethylindenyl)zirconium dichloride,
phenyl(methyl)silylbis-1-indenylzirconium dichloride,
phenyl(vinyl)silylbis-1-indenylzirconium dichloride,
diphenylsilylbis-1-indenylzirconium dichloride,
dimethylsilylbis(1-(2-methyl-4-t-butylindenyl))zirconium dichloride,
methylphenylsilylbis(1-(2-methyl-4-isopropylindenyl))-zirconium dichloride,
dimethylsilylbis(1-(2-ethyl-4-methylindenyl))zirconium dichloride,
dimethylsilylbis(1-(2,4-dimethylindenyl))zirconium dichloride,
dimethylsilylbis(1-(2-methyl-4-ethylindenyl))zirconium dichloride,
dimethylsilylbis(2-methyl-4,6-diisopropylindenyl))zirconium dichloride,
dimethylsilylbis(2,4,6-trimethylindenyl))zirconium dichloride,
methylphenylsilylbis(2-methyl-4,6-diisopropylindenyl)-zirconium dichloride,
1,2-ethanediylbis(2-methyl-4,6-diisopropylindenyl)-zirconium dichloride
and dimethylsilylbis(2-methyl-4,5-benzoindenyl)zirconium dichloride.

Chiral metallocenes are preferably employed as a racemate in the preparation of the catalyst according to the invention. However, it is also possible to use the pure R- or S-form. Optically active polymer can be prepared using these pure stereoisomeric forms. However, the meso form of the metallocenes should be separated off since the polymerization-active center (the metal atom) in these compounds is no longer chiral due to mirror symmetry at the central metal atom and it is therefore not possible to produce any highly tactic polymer. If the meso form is not separated off, atactic polymer is formed alongside isotactic and syndiotactic polymer. For certain applications, for example soft moldings, or for the production of polyethylene grades, this may be entirely desirable.

The supported catalyst is prepared at a temperature between −20° and +120° C., preferable at from 15° to 40° C., by reacting the catalyst component A with the catalyst component B in such a manner that the insoluble catalyst component A is reacted as a 1–40% by weight, preferably 5–20% by weight, suspension in an aliphatic, inert suspension medium, such as n-decane, hexane, heptane or diesel oil, with a solution in an inert solvent, such as toluene, hexane, heptane or dichloromethane, or with the finely ground solid of catalyst component B. Conversely, it is also possible to react a solution of catalyst component B with the solid of catalyst component A.

The reaction is carried out by vigorous mixing, for example by stirring at an Al/Zr molar ratio of between 100/1 and 10,000/1, preferably between 100/1 and 2,000/1, and a reaction time of between 5 and 120 minutes, preferably between 10 and 30 minutes, under inert conditions.

During the reaction time for the preparation of the catalyst, changes in the color of the reaction mixture occur, in particular if metallocenes having absorption maxima in the visible region are used; the progress of the reaction can be followed from these changes in color.

When the reaction time is complete, the supernatant solution is separated off, for example by filtration or decanting, and the solid which remains is washed once to 5 times with an inert suspending medium, such as toluene, n-decane, hexane, diesel oil or dichloromethane. This washing operation (extraction) serves to remove soluble constituents In the catalyst formed, in particular to remove unreacted end thus soluble metallocene. It is advantageous, but not necessary, to carry out the entire reaction in a pressure filter. It is also possible to use various Inert solvents for washing the solid. The filtrate and the washing liquids are colorless, irrespective of the metallocene employed previously.

The catalyst prepared in this way can be dried in vacuo as a powder or resuspended as a suspension, in an inert suspending medium, such as, for example, heptane, hexane, diesel oil or dichloromethane, metered into the polymerization system.

The catalyst according to the invention can advantageously be prepolymerized in the gas phase, in the liquid phase or in suspension.

The present invention furthermore relates to a process for the preparation of an olefin polymer by polymerization or copolymerization of an olefin of the formula $R^a$—CH=CH—$R^b$ in which $R^a$ and $R^b$ are identical or different and are a hydrogen atom or a hydrocarbon radical having 1 to 14 carbon atoms, or $R^a$ and $R^b$, together with the atoms connecting them, can form a ring, at a temperature of from −60° to 200° C., at a pressure of from 0.5 to 1 00 bar, in solution, in suspension or in the gas phase, in the presence of a catalyst, when the catalyst used is the reaction product according to the invention.

The polymerization or copolymerization is carried out in a known manner in solution, in suspension or in the gas phase, continuously or batchwise, in one ore more steps, at a temperature of from −60° to 200° C., preferably from 30° to 80° C., particularly preferably from 50° to 80° C. Olefins of the formula $R^a$—CH=CH—$R^b$ are polymerized or copolymerized. In this formula, $R^a$ and $R^b$ are identical or different and are a hydrogen atom or an alkyl radical having 1 to 14 carbon atoms. However, $R^a$ and $R^b$ may also, together with the carbon atoms connecting them, form a ring. Examples of such olefins are ethylene, propylene, 1-butane, 1-hexene, 4-methyl-1-pentene, 1-octene, norbornene, or diolefins such as norbornadiene, ethylidennorbornen, vinylnorbornen, dicyclopentadien and 1,4,5,8-dimethano-1,2,3,4,4a,5,8,8a-octahydronaphthalene (DMON). In particular, propylene and ethylene are polymerized or copolymerized or a cycloolefin polymer is prepared, wherein 0.1 to 100% by weight, with respect to the total amount of monomers employed, of at least one monomer of the formulae I, II, III, IV, V or VI

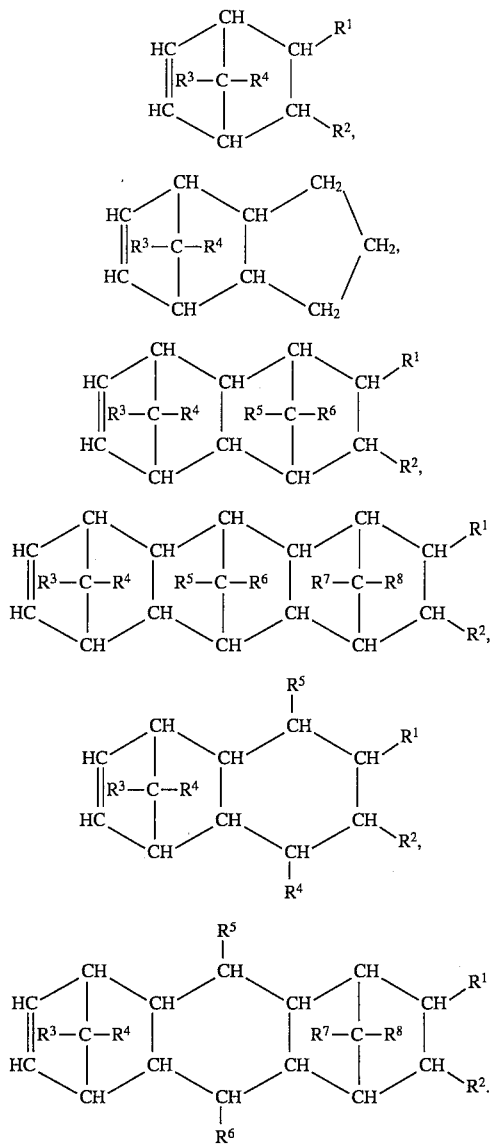

in which $R^1$, $R^2$, $R^3$, $R^4$, $R^5$, $R^6$, $R^7$ and $R^8$ are identical or different and are a hydrogen atom or a $C_1$–$C_8$-alkyl radical, it being possible for the same radicals in the various formulae to have different meanings, 0 to 99% by weight, with respect to the total amount of monomers employed, of a cycloolefin of the formula VII

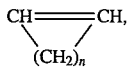

in which n is a number form 2 to 10, an 0 to 99% by weight, with respect to the total amount of monomers employed, of at least one acyclic olefin of the formula VIII

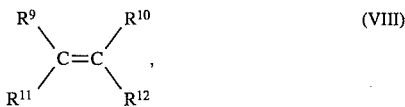

in which $R^9$, $R^{10}$, $R^{11}$ and $R^{12}$ are identical or different and are a hydrogen atom or a $C_1$–$C_8$-alkyl radical, are polymerized.

If necessary, hydrogen is added as molecular weight regulator and/or to increase the activity. The total pressure in the polymerization system is from 0.5 to 100 bar. The polymerization is preferably carried out in the industrially particularly interesting pressure range of from 5 to 64 bar.

The catalyst according to the invention is preferably used in a concentration, based on the transition metal, of from $10^{-3}$ to $10^{-8}$ mol, preferably from $10^{-4}$ to $10^{-7}$ mol, of transition metal per $dm^3$ of solvent or per $dm^3$ of reactor volume.

If the polymerization is carried out as suspension or solution polymerization, an inert solvent which is customary for the Ziegler low-pressure process is used. For example, the process is carried out in an aliphatic or cycloaliphatic hydrocarbon; specific examples of these are butane, pentane, hexane, heptane, isooctane, cyclohexane and methylcyclohexane.

It is furthermore possible to use a gasoline or hydrogenated diesel oil fraction. Toluene can also be used.

If inert solvents are used, the monomers are metered in gas or liquid form.

The polymerization can last as long as desired, since the catalyst system to be used according to the invention only exhibits a slight time-dependent decrease in polymerization activity.

Before the catalyst is introduced into the reactor, another alkylaluminum compound, such as, for example, trimethylaluminum, triethylaluminum, triisobutylaluminium or triisopropylaluminum, can additionally be added to the polymerization system in a concentration of from 2 to 0.001 mmol of Al per kg of reactor contents in order to render the polymerization system inert (for example to remove catalyst poisons present in the olefin).

However, it is not absolutely necessary to employ further substances to catalyze the polymerization reaction, i.e. the catalyst according to the invention can, and this is preferred, be used as the only catalyst for the olefin polymerization.

The molecular weight of the polymer formed can also be influenced by changing the polymerization temperature, periodic changes or a multistep process or the use of more than one metallocene also allowing polymers having a broad molecular weight distribution to be obtained.

In additions, the polymer molecular weight achieved using the solid catalyst according to the invention is determined by the type of metallocene used, by the aluminum compound and by the molar aluminum to metallocene ratio.

The process according to the invention (the catalyst according to the invention) is primarily distinguished by the fact that the undesired reactor deposits are prevented during the polymerization. A further advantage of the process is the complete omission of aromatic solvents and the simple way in which the catalyst is prepared.

By the process according to the invention, polymers with very narrow molecular weight distributions ($M_w/M_n$) of about 2 to 10, especially 2 to 4 can be obtained.

EXAMPLES

All glass equipment was heated in vacuo and flushed with argon. All operations were carried out in Schlenk flasks with exclusion of moisture and oxygen. The solvents used were in each case freshly distilled over Na/K alloy under argon and stored in Schlenk flasks.

The polymer melting points indicated are determined by a DSC measurement for the 2nd melting (heating rate: 10°/min).

To prepare the catalyst component A, an explosion-proof stainless steel reactor was constructed with a 60 bar pumping system inert gas supply, temperature control system via jacket cooling and a 2nd cooling circuit via a heat exchanger on the pumping system. The pumping system draws the reactor contents in by means of a pump via a connection on the reactor base, forces them into a mixer and back into the reactor through a rising line via a heat exchanger. The mixer is designed so that, due to a narrowed tube cross section, a increased flow rate is generated in the feed, in the turbulence zone of which a thin feed line is arranged axially and opposite to the flow direction, through which a defined amount of water can in each case be fed in cycles by means of 40 bar of argon. The reaction is monitored via a sampler on the pump circuit.

However, other reactors, as described, for example, in DE 37 31 665 and DE 40 04 477, are also suitable in principle.

The metallocene rac-dimethylsilylbis-1-(2-methylindenyl)-zirconium dichloride is synthesized as described in DE-A 40 35 883 and DE-A 40 35 886. The metallocene diphenylmethylene-9-fluorenylcyclopentadienylzirconium dichloride is synthesized as described in EP 387 690. The metallocene isopropylidene-9-fluorenylcyclopentadienyl-zirconium dichloride is synthesized as described in J. Am. Chem. Soc., 110 (1988) 6255. The metallocene rac-dimethylsilylbis-1-(2-methyl-4,5-benzoindenyl)zirconium dichloride is synthesized as previously described herein (see Formule (K)).

The aluminum is determined after hydrolysis using water and sulfuric acid by complexometric titration by the Schwarzenbach method. Trimethylaluminium is purchased as a pure substance from SCHERING AG. Toluene-soluble methylaluminoxane is purchased for the comparative examples as a 10% by weight toluene solution form SCHERING AG and, according to an aluminium determination, contains 36 mg Al/ml solution. The mean degree of oligomerization, determined from the freezing point depression in benzene, is n=20.

Example 1

Preparation of catalyst component A 5 dm$^3$ of aromatic-free diesel oil (boiling point 100°–120° C.) are introduced into a stirred 16 dm$^3$ reactor under inert conditions, 0.50 dm$^3$ of trimethylaluminium (5.2 mol) are added, and the temperature is held at 25° C. 200 g of Aerosil (R) 812 (Degussa AG) which has been previously dried at 120° C. in an argon fluidized bed are metered into this reactor via a solids hopper and homogeneously suspended with the aid of the stirrer and the pumping system. A total of 76.5 g of water in 0.1 ml portions at 15 second intervals are metered in at the mixer over the course of 3.25 hours. The pressure, raised by introduced argon and reaction gases, is kept constant at 10 bar by a pressure release valve. When all the water has been added, the pumping system is switched off and stirring is continued for a further 5 hours at 25° C.

The solid catalyst component A prepared in this way is employed as 12% strength by weight suspension in diesel oil (boiling point 100°–120° C.). The aluminum content is 1.06 mmol of Al per ml of suspension. The isolated solid contains 31% by weight of Al. The suspension medium contains less than 0.1% by weight of aluminum.

Example 2

5 ml of the suspension of catalyst component A from Example 1 are introduced into a G3 Schlenk frit under argon and filtered. The solid which remains is resuspended in 20 ml of an aromatic-free, inert diesel oil (boiling point 100° to 120° C.). 0.5 ml of a 1/500 molar solution of biscyclopentadienylzirconium dichloride in absolute toluene is metered into this suspension, and the mixture is stirred for ¼ hour at 30° C. The mixture is subsequently filtered, and the solid which remains is washed with 20 ml of diesel oil and resuspended in 20 ml of diesel oil for the polymerization.

Polymerization

A dry 1.5 dm$^3$ tubular reactor is flushed with nitrogen in order to remove the oxygen and filled with 0,9 dm$^3$ of an inert diesel oil (boiling point 100°–120° C.). After the reactor has been flushed with ethylene, the temperature is held at 70° C., and the catalyst suspension is metered in at an ethylene pressure of 7 bar without introduction of additional activator. After 2 hours, the pressure in the reactor is released, and the polymer is filtered off from the suspension and dried for 12 hours in a vacuum drying cabinet. 23 g of polyethylene powder having a bulk density of 0. 175 kg/dm$^3$ and a viscosity of 392 cm$^3$/g are obtained. The reactor exhibits no deposits on the outer wall or stirrer. The molecular weight distribution (according to GPC) is $M_w/M_n$=2.6.

Comparative Example 1

The polymerization from Example 2 is repeated, with the difference that the catalyst used is 0.029 mg of bis-cyclopentadienylzirconium dichloride dissolved in a 10% strength by weight solution of methylaluminoxane in toluene (12 mmol of Al). Under otherwise indentical conditions, 40 g of polyethylene having a viscosity of 380 cm$^3$/g and a bulk density of 0.060 kg/dm$^3$ are produced. When the reactor is opened, a continuous deposit with a thickness of 1 mm is visible on the outer wall and stirrer.

Comparative Example 2

The polymerization from Example 2 is repeated, with the difference that the mixture of 20 ml of the suspension of catalyst component A from Example 1 with 0.5 ml of a 1/500 molar solution of biscyclopentadienylzirconium dichloride in toluene is used without filtration and washing. Under otherwise identical conditions, 37.3 g of polyethylene having a viscosity of 407 cm$^3$/g and a bulk density of 0.067 kg/dm$^3$ are produced. When the reactor is opened, a continuous deposit with a thickness of 0.2 mm is visible on the outer wall and stirrer.

Example 3

The catalyst preparation from Example 2 is repeated, with the difference that 800 ml of the suspension of catalyst component A from Example 1 and 11.7 mg of biscyclopentadienylzirconium dichloride, dissolved in toluene, are employed. A 160 dm$^3$ reactor which has been rendered inert is filled with 80 l of diese oil (boiling point 100°–120° C.) and heated to 50° C., and 3 bar of ethylene are introduced. The catalyst is added via a transfer tube, and the ethylene pressure is increased to 7 bar and the temperature is kept constant at 70° C. by cooling. After a polymerization time of 3 hours, the pressure in the reactor is released and the suspension is filtered off in a pressure filter. Drying in a vacuum drying cabinet gives 4.3 kg of polyethylene, corresponding to a reduced contact time yield of 5.1 [kg/ (mmol·h·bar), having a bulk density of 140 g/dm$^3$. The reactor exhibits no deposits on the wall or stirrer. The product has a density of 0,953 g/cm$^3$, a viscosity of 463 cm$^3$/g and a molecular weight distribution (according to GPC) of $M_w/M_n$=2.5.

Example 4

The catalyst preparation from Example 2 is repeated, with the difference that the washing is carried out with anhydrous hexane instead of with diesel oil (boiling point 100°–120° C.). The catalyst is subsequently dried for 2 hours at $10^{-3}$ mbar and 30° C. to give a free-flowing powder. Analysis shows 27% by weight of Al and 40 ppm of Zr.

1250 mg of the dry catalyst are mixed with 80 g of polystyrene powder which has been rendered inert, as a stirring aid, and the polymerization is carried out in a 1.5 dm$^3$ reactor with propeller stirrer for 1 hour at 70° C. and at 4 bar of ethylene. The pressure in the reactor is released, and the powder is removed and extracted with boiling toluene. After drying in vacuo, 29 g of a polyethylene having a viscosity of 420 cm$^3$/g remain.

Example 5

30 mg of diphenylmethylene-9-fluorenylcyclopentadienyl-zirconium dichloride are dissolved in a little toluene and mixed with 60 ml of the suspension of catalyst component A from Example 1 in a Schlenk frit. After 15 minutes, the solution is filtered, and the filter cake is washed with diesel oil and subsequently resuspended in 20 ml of diesel oil.

Polymerization

A dry nitrogen-flushed 16 dm$^3$ reactor is filled with 10 dm$^3$ of propylene and warmed to 30° C. After 15 minutes, the catalyst suspension is metered into the reactor via a pressure lock without further addition of activator. On initiation of the polymerization, the internal reactor temperature is increased to the polymerization temperature of 50° C. at 10°/min by additional supply of heat and is subsequently kept at this temperature by cooling. After a polymerization time of 1 hour, the polymerization is terminated by addition of isopropanol, the pressure in the reactor is released and the reactor is opened. The reactor wall and stirrer are completely free from deposits. Vacuum drying of the product gives 0.56 kg of free-flowing polypropylene powder having a viscosity of 350 cm$^3$/g and a melting point (DSC) of 111.2° C. The mean particle diameter $d_{50}$ according to screen analysis is 600 μm.

Comparative Example 3

To prepare the catalyst, 9.4 mg of diphenylmethylene-9-fluorenylcyclopentadienylzirconium dichloride are dissolved in 20 cm$^3$ of a toluene solution of methylaluminoxane (corresponding to 27 mmol of Al) and reacted with the methylaluminoxane by standing for 15 minutes. In parallel, a dry 16 dm$^3$ reactor is flushed with nitrogen and filled with 10 dm$^3$ reactor is flushed with nitrogen and filled with 10 dm$^3$ of liquid propene. 30 cm$^3$ of a toluene solution of methylaluminoxane are added to this reactor, and the mixture is stirred at 30° C. for 15 minutes. The catalyst solution is subsequently introduced into the reactor, and the polymerization system is heated to the polymerization temperature of 50° C. (10° C./min) by supply of heat and kept at this temperature for 1 hour by cooling. The polymerization is then terminated by addition of 5 ml of isopropanol, the pressure in the reactor is released, and the reactor is opened. A continuous deposit with a thickness of 2 mm is evident. Vacuum drying of the product gives 0.2 kg of syndiotactic polypropylene having a viscosity of 502 cm$^3$/g, $M_w$=4.97·$10^5$ g/mol, $M_w/M_n$=2.2 and a melting point (DSC) of 134.1° C. The mean particle diameter $d_{50}$ according to screen analysis is 2500 μm.

Example 6

The polymerization is carried out as in Example 5, with the difference that 4.9 mg of rac-dimethylsilylbis-2-methyl-1-indenylzirconium dichloride are reacted with 60 ml of a suspension of catalyst component A from Example 1 and the polymerization is carried out at 70° C. After opening, the reactor is free from deposits. Vacuum drying of the product gives 0.35 kg of polymer having a viscosity of 170 cm$^3$/g and a melting point (DSC) of 142.8° C. The mean particle diameter $d_{50}$ of the free flowing powder according to screen analysis is 1000 μm, and the fines content (<100 μm) is 0.8% by weight.

Comparative Example 4

The procedure is as in Comparative Example 3, with the difference that 5.2 mg of rac-dimethylsilylbis-1-(2-methylindenyl)zirconium dichloride are employed and the polymerization is carried out at 70° C.

After the polymerization, a continuous deposit with a thickness of 3 mm is evident. Vacuum drying of the product gives 1.3 kg of polypropylene having a viscosity of 151 cm$^3$/g and a melting point (DSC) of 145° C. The mean particle diameter $d_{50}$ according to screen analysis is 350 μm.

Example 7

1 mg of isopropylidene-9-fluorenylcyclopentadienylzirconium dichloride, dissolved in toluene, is added to 40 ml of a suspension of the solid catalyst component A from Example 1, and the mixture is stirred for 30 minutes. In parallel, a 1.5 l reactor is flushed with ethylene and filled with 600 cm$^3$ of an 85% strength by weight solution of norbornene in toluene and 20 ml of a suspension of solid catalyst component A from Example 1, the mixture is subsequently stirred at 70° C. for 30 minutes and saturated with 6 bar of ethylene. After addition of the catalyst, the mixture is polymerized for 1 hour at 70° C., the pressure being kept constant at 6 bar by subsequent introduction of ethylene. The reaction solution is decompressed, stirred for 30 minutes with 10 cm$^3$ of water and filtered. The clear solution is added dropwise to 5 dm$^3$ of acetone, the mixture is stirred for 10 minutes, and the precipitated polymer is filtered off and washed with acetone. Drying at 80° C. in a vacuum drying cabinet gives 32 g of copolymer having a viscosity of 230 cm$^3$/g and a glass transition temperature $T_g$ of 156° C.

Comparative Example 5

The polymerization from Example 7 is repeated, with the difference that the 40 cm$^3$ of the suspension of the solid catalyst component A from Example 1 are replaced by 20 cm³ of a 10% strength by weight solution of MAO in toluene. 15.7 g of copolymer having a viscosity of 86 cm³/g and a glass transition temperature $T_g$ of 156° C. are obtained.

Example 8

The polymerization from Example 7 is repeated, with the difference that, instead of 1 mg of isopropylidene-9-fluorenylcyclopentadienylzirconiumdichloride, 5 mg of diphenylmethylene-9-fluorenylcyclopentadienylzirconium dichloride are stirred with catalyst component A from Example 1 and the polymerization is carried out at 3 bar of ethylene and at 40° C. 24 g of copolymer having a viscosity of 367 cm³/g and a glass transition temperature $T_g$ of 176° C. are obtained.

Comparative Example 6

The polymerization from Example 8 is repeated, with the difference that the 40 cm³ of suspension of the solid catalyst component A from Example 1 are replaced by 20 cm³ of a 10% strength by weight solution of MAO in toluene. 8.9 g of copolymer having a viscosity of 187 cm³/g are obtained.

Example 9

Preparation of catalyst component A:

The reaction from Example 1 is repeated, with the difference that the diesel oil is replaced by 6 dm³ of n-decane and the 200 g of Aerosil R 812 (Degussa AG) are replaced by 200 g of silica gel SD 3216-30 (GRACE AG). The silica gel has previously been dried for 10 hours at 140° C. in a heated fluidized bed. The BET surface area of this support is 310 m²/g. 72 g of water are metered into the resultant suspension in the same way.

The solid catalyst component A prepared in this way is employed as a 10% strength by weight suspension in n-decane. The aluminum content is 0.96 mmol of Al per ml of suspension. The isolated solid contains 28% by weight of Al. The suspension medium contains 0.1% by weight of aluminum.

Example 10

40 ml of the suspension of the solid catalyst component A from Example 9 are filtered off with suction in a Schlenk frit and resuspended in diesel oil (boiling point 100°–120° C.). 1.9 mg of rac-dimethylsilylbis(2-methyl-4,5-benzoindenyl)zirconium dichloride are dissolved in 5 ml of toluene, the solution is mixed with the suspension, and the mixture is filtered after 15 minutes. The filter cake is subsequently washed with a little diesel oil and resuspended in 5 ml of diesel oil.

Polymerization

The polymerization is carried out as in Example 5. However, addition of the catalyst suspension is preceded by the metering of 15 ml of a 20% strength by weight solution of triisobutylaluminum in diesel oil into the reactor. Vacuum drying of the product gives 0.27 kg of free-flowing polypropylene powder having a viscosity of 380 cm³/g. The mean particle diameter $d_{50}$ according to screen analysis is 550 μm.

Example 11

40 ml of the suspension of the solid catalyst component A from Example 9 are filtered with suction in a Schlenk frit and resuspended in diesel oil (boiling point 100°–120° C.). 20.3 mg of rac-dimethylsilylbis(2-methylindenyl)-zirconium dichloride are dissolved in 10 ml of toluene, the solution is mixed with the suspension, and the mixture is filtered after 15 minutes. The filter cake is subsequently washed with a little diesel oil and resuspended in 10 ml of diesel oil.

Polymerization

A dry nitrogen-flushed 70 dm³ reactor is filled with 40 dm³ of propylene and warmed to 30° C., and 60 ml of a 20% by weight solution of triisobutylaluminum in diesel oil are added. After 15 minutes, the catalyst suspension is metered in via a pressure lock. The internal temperature of the reactor is increased to 70° C. at 2° C./min and subsequently kept at this temperature for 2 hours by cooling. The reaction is terminated by addition of isopropanol. The product is vacuum-dried to give 8.2 kg of free-flowing polypropylene powder having a viscosity of 160 cm³/g. The mean particle diameter $d_{50}$ is 550 μm, and the fines content (<100 μm) according to screen analysis is 1.5% by weight.

Example 12

6.2 ml of the suspension of the catalyst component A from Example 9 are introduced into a G3 Schlenk frit under agron and filtered. The solid which remains is resuspended in 20 ml of an aromatic-free, inert diesel oil (boiling point 100° to 120° C.). 0.25 ml of a 1/500 molar solution of biscyclopentadienylzirconium dichloride in absolute toluene is metered into this suspension, and the mixture is stirred at 30° C. for ¼ hour. The mixture is subsequently filtered, and the solid which remains is washed with 20 ml of diesel oil and resuspended in 20 ml of diesel oil for the polymerization.

Polymerization

The polymerization is carried out as described in Example 2.19 g of polyethylene powder having a bulk density of 0.160 kg/dm³ and a viscosity of 265 cm³/g are obtained. The reactor exhibits no deposits on the wall or stirrer. The molecular weight distribution (according to GPC) is $M_w/M_n=2.6$.

Example 13

Preparation of catalyst component A:3

5 dm³ of n-decan are introduced into a stirred 16 dm³ reactor under inert conditions, 0.50 dm³ of trimethylaluminum (5.2 mol) are added, and the temperature is held at 25° C. 200 g of silica gel SD 3216-20 (GRACE AG) which has been previously dried at 130° C. under vacuum ($10^{-2}$ mbar) for 24 hours are metered into this reactor via a solids hopper and homogenously suspended with the aid of the stirrer and the pumping system. The volatile portion of the silica gel determined by thermogravimetric analysis was reduced from >5% strength by weight in the raw material to <1% strength by weight during the drying procedure. The BET surface of this support is 310 m²/g. The average particle size is 25 Mm and the pore volume ($H_2O$) is 1.6 cm³/g. A total of 78 g of water in 0. 1 ml portions at 15 second intervals are metered in at the mixer over the course of 3.25 hours. The pressure, raised by introduced argon and reaction gases is kept constant at 10 bar by a pressure, raised valve. When all the water has been added, the pumping system is switched off and stirring is continued for a further 5 hours at 25° C.

The solid catalyst component A prepared in this way is employed as 13.2% strength by weight suspension in n-decan. The aluminum content is 1.46 mmol of Al per ml of suspension. The isolated solid contains 30% by weight of Al. The suspension medium contains less than 0.1% by weight of aluminum.

Example 14

13 cm$^3$ of the suspension of the solid catalyst component A from Example 13 are filtered off with suction in a Schlenk frit and resuspended in diesel oil (boiling point 100°–120° C.). 3.3 mg of rac-dimethylsilylbis(2-methyl-4,6-diisopropylindenyl)zirconium dichloride are dissolved in 5 cm$^3$ of toluene, the solution is mixed with the suspension, and the mixture is filtered after 15 minutes. The filter cake is subsequently washed with a little diesel oil and resuspended in 10 cm$^3$ of diesel oil.

Polymerization

A dry nitrogen-flushed 16 dm$^3$ reactor is filled with 10 dm$^3$ of propylene and warmed to 30° C. 3 ml of pure triisobutylaluminum are metered into the reactor. After 15 min the catalyst suspension is metered into the reactor via a pressure lock. On initiation of the polymerization, the internal reactor temperature is increased to the polymerization temperature of 70° C. at 10° C./min by additional supply of heat and is subsequently kept at this temperature by cooling. After a polymerization time of 1 hour, the polymerization is terminated by addition of isopropanol, the pressure in the reactor is released and the reactor is opened. The reactor wall and stirrer are completely free from deposits. Vacuum drying of the product gives 0.4 kg of free-flowing polypropylene powder having a viscosity of 324 cm$^3$/g, a melting point (DSC) of 143° C. and a molweight (weightaverage) Mw=431000. The molecular weight distribution (according to GPC)is Mw/Mn=2.6. Melt flow rate (230° C./5 kg)is MFR=3.4 dg/min. The mean particle diameter $d_{50}$ of the free flowing powder according to screen analysis is 200 μm.

Comparative Example 7

The polymerization from Example 14 is repeated, with the difference that the 13 cm$^3$ of the suspension of the solid catalyst component A from Example 13 are replaced by 20 cm$^3$ of a 10% strength by weight solution of MAO in toluene (30 mmol of Al) and the 3 cm$^3$ of triisobutylaluminum in the reactor are replaced by 8 cm$^3$ of the same MAO solution. Under otherwise identical conditions, 0.9 kg of polypropylene having a viscosity of 260 cm$^3$/g, a melting point (DSC) of 143° C. and a molweight (weightaverage) Mw=297000. The molecular weight distribution (according to GPC) is Mw/Mn=2.3. When the reactor is opened, a continuous deposit with a thickness of 3 mm is visible on the outer wall and the stirrer.

Example 15

15 cm$^3$ of the suspension of the solid catalyst component A from Example 13 are filtered off with suction in a Schlenk frit and resuspended in diesel oil (boiling point 100°–120° C.). 3 mg of rac-dimethylsilylbis(2-methyl-4,5-benzoindenyl)zirconium dichloride are dissolved in 5 cm$^3$ of toluene, the solution is mixed with the suspension, and the mixture is filtered after 15 minutes. The filter cake is subsequently washed with a little diesel oil and resuspended in 10 cm$^3$ of diesel oil.

Polymerization

The polymerization is carried out as described in Example 14. Vacuum drying of the product gives 1.3 kg of free-flowing polypropylene powder having a bulk density of 0.13 kg/dm$^3$ and a viscosity of 267 cm$^3$/g, a melting point (DSC) of 148° C. and a molweight (weightaverage) Mw=347000. The molecular weight distribution (according to GPC) is Mw/Mn=2.5.

We claim:

1. A supported polymerization catalyst comprising the reaction product of (A) a supported, organoaluminum compound which is prepared by preparing a suspension of a support having a water content of less than 3% by weight in a solution of at least one alkylaluminum compound under inert conditions and hydrolyzing the suspension by the addition of water to the suspension and (B) a metallocene catalyst component.

2. The polymerization catalyst according to claim 1, wherein the alkylaluminum compound is of the formula AlRR$^1$R$^2$ where R, R$^1$ and R$^2$ may be identical or different and are a $C_1$–$C_6$-alkyl group, a $C_1$–$C_6$-fluoroalkyl group, a $C_6$–$C_{18}$-aryl group, a $C_6$–$C_{18}$-fluoroaryl group or hydrogen.

3. The polymerization catalyst according to claim 1, wherein the alkylaluminum compound is of the formula AlRR$^1$R$^2$ where R, R$^1$ and R$^2$ may be identical or different and are methyl, ethyl, i-propyl, i-butyl, or n-butyl.

4. The polymerization catalyst according to claim 1, wherein the alkylaluminum compound is trimethylaluminum.

5. The polymerization catalyst according to claim 1, wherein the support is an oxide of silicon or aluminum.

6. The polymerization catalyst according to claim 1, wherein the support is employed in an amount of less than 0.1 kg per mol of alkylaluminum.

7. The polymerization catalyst according to claim 1, wherein the metallocene catalyst component (B) is a metallocene or a mixture of more than one metallocene.

8. The polymerization catalyst according to claim 1, wherein the metallocene catalyst component (B) is a zirconocene.

9. The polymerization catalyst according to claim 4, wherein the support is an oxide of silicon or aluminum.

10. The polymerization catalyst according to claim 9, wherein the support is employed in an amount of less than 0.1 kg per mol of alkylaluminum.

11. The polymerization catalyst according to claim 10, wherein the metallocene catalyst component (B) is a metallocene or a mixture of more than one metallocene.

12. The polymerization catalyst according to claim 11, wherein the metallocene catalyst component (B) is a zirconocene.

13. The polymerization catalyst according to claim 11, wherein the metallocene is biscyclopentadienylzirconium dichloride.

* * * * *